US010472016B2

(12) United States Patent
Choi et al.

(10) Patent No.: US 10,472,016 B2
(45) Date of Patent: Nov. 12, 2019

(54) BICYCLE FRAME AND MANUFACTURING METHOD THEREOF

(71) Applicants: HYUNDAI MOTOR COMPANY, Seoul (KR); KIA MOTORS CORPORATION, Seoul (KR)

(72) Inventors: Jungnam Choi, Seongnam-si (KR); Sung Dae Lim, Gunpo-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 134 days.

(21) Appl. No.: 15/728,765

(22) Filed: Oct. 10, 2017

(65) Prior Publication Data

US 2018/0346054 A1    Dec. 6, 2018

(30) Foreign Application Priority Data

Jun. 1, 2017 (KR) .................. 10-2017-0068264

(51) Int. Cl.

| | |
|---|---|
| B62K 19/34 | (2006.01) |
| B62K 19/20 | (2006.01) |
| B62M 6/55 | (2010.01) |
| B23K 101/06 | (2006.01) |
| B23K 101/00 | (2006.01) |

(52) U.S. Cl.
CPC ............. *B62K 19/34* (2013.01); *B62K 19/20* (2013.01); *B23K 2101/006* (2018.08); *B23K 2101/06* (2018.08); *B62M 6/55* (2013.01)

(58) Field of Classification Search
CPC ........ B62K 19/34; B62M 6/55; B23K 101/06; B23K 2101/006
See application file for complete search history.

(56) References Cited

U.S. PATENT DOCUMENTS

| | | | | |
|---|---|---|---|---|
| 5,056,704 | A  * | 10/1991 | Martin ................. | B23K 33/006 228/173.4 |
| 9,908,582 | B1 * | 3/2018 | Choi ........................ | B62K 3/02 |
| 10,232,907 | B2 * | 3/2019 | Douglas .................. | B62M 6/55 |
| 2010/0320721 | A1 * | 12/2010 | Chung ..................... | B62K 3/04 280/281.1 |
| 2011/0278816 | A1 * | 11/2011 | Chamberlain .......... | B21C 37/29 280/281.1 |
| 2012/0038129 | A1 * | 2/2012 | D'Aluisio ............... | B62K 19/20 280/281.1 |
| 2014/0210318 | A1 * | 7/2014 | Yao ......................... | H02K 7/14 310/67 R |
| 2016/0194053 | A1 * | 7/2016 | Preining .................. | B62M 6/55 310/91 |
| 2017/0016526 | A1 * | 1/2017 | Watarai .................. | F16H 57/025 |
| 2017/0057582 | A1 * | 3/2017 | Nishikawa .............. | B62M 6/55 |
| 2017/0096189 | A1 * | 4/2017 | Moriyama ............ | B62K 25/286 |
| 2017/0313381 | A1 * | 11/2017 | Mano .................... | B62K 25/286 |
| 2018/0251188 | A1 * | 9/2018 | Durdevic ................ | B62M 6/45 |

* cited by examiner

*Primary Examiner* — Joseph M Rocca
*Assistant Examiner* — Marlon A Arce
(74) *Attorney, Agent, or Firm* — Brinks Gilson & Lione

(57) ABSTRACT

The present disclosure provides a bicycle frame including: a main frame; a support bracket formed separately from the main frame and bonded to a lower end portion of the main frame, and a motor mounting having a motor mounting portion configured to mount a motor therein, wherein the motor mounting bracket is formed separately from the support bracket, and is bonded to the support bracket.

12 Claims, 8 Drawing Sheets

(A)

(B)

(A)

(B)

BICYCLE FRAME AND MANUFACTURING METHOD THEREOF

CROSS-REFERENCE TO RELATED APPLICATION

The present application claims priority to and the benefit of Korean Patent Application No. 10-2017-0068264 filed on Jun. 1, 2017, which is incorporated herein by reference in its entirety.

FIELD

The present disclosure relates to a bicycle frame and manufacturing method. More particularly, the present disclosure relates to a bicycle frame with a tube shape where left and right panels are formed through stamping process and bonded, and having a module type motor mounting portion where a motor is mounted on one side of a tube.

BACKGROUND

The statements in this section merely provide background information related to the present disclosure and may not constitute prior art.

Generally, a bicycle frame includes a head tube, a seat tube, a top tube, a down tube, a seat stay and a chain stay.

An upper end portion of the head tube is connected with a steering handle portion and a lower end portion of the head tube is connected with a front wheel portion. An upper end portion of the seat tube is connected with a saddle portion and a lower portion of the seat tube is connected with a chain driver.

The top tube and the down tube connect and support the head tube and the seat tube, whereas the seat stay and the chain stay connect and support a rear wheel portion and the seat tube.

The bicycle frame may have both a top tube and a down tube, but in some cases, only one main tube may be connected between the head tube and the seat tube.

On the other hand, an electric bicycle is applied to a bicycle frame as a power source, and the bicycle frame is provided with a motor mounting portion for mounting the motor.

The engine mounting section is connected to the lower end portion of the main tube which is combined with the top tube and the down tube in the bicycle frame. The upper end portion of the main tube is connected to the head tube and the middle portion of the main tube is connected with the seat tube.

The seat tube is connected with the rear end portion of the chain stay, and the lower end portion of the seat tube and the front end portion of the chain stay are connected with the motor mounting portion.

As described above, the frame of the electric bicycle is made by manufacturing the motor mounting part according to the specification and shape of the motor, cutting the tube as the base material according to the required length, and welding the motor mounting part and the tube.

The motor is mounted on the motor mounting portion of the bicycle frame through the motor mounting bracket made of aluminum casting.

With this method, it may be difficult to automate the production of bicycle frames, so productivity may be deteriorated and production cost may increase.

Therefore, in recent years, research has been developed to improve the productivity of the frame by stamping the plate material to bond the bicycle frame to the left and right.

However, in the conventional art in which a bicycle frame with a motor mounting part is stamped, a frame is produced by a process using a stamping mold. Therefore, when the specification and shape of the motor are changed, a new stamping die must be manufactured so that the frame has a motor mounting portion corresponding to the specification and shape of the motor.

SUMMARY

The present disclosure provides a bicycle frame and manufacturing method thereof where a single stamping mold is used in manufacturing without the need to make a new stamping mold according to various specifications and shapes of motors.

A bicycle frame in some forms of the present disclosure may include a main frame, a support bracket formed separately from the main frame and bonded to a lower end portion of the main frame, and a motor mounting bracket having a motor mounting portion configured to mount a motor therein, wherein the motor mounting bracket is formed separately from the support bracket and is bonded to the support bracket.

The main frame may be formed by bonding both side panels formed through stamping in a predetermined shape.

The support bracket and the motor mounting bracket may be bonded to each other and may be provided as a sub frame corresponding to a specification and a shape of the motor.

The sub frame may be bonded to the lower end portion of the main frame through the support bracket.

The main frame may include a plurality of tube bodies.

An insertion hole may be formed at a lower end portion of the tube body.

The support bracket may include an insertion portion that is capable of inserting into the insertion hole of the tube body and bonded along the circumference of the insertion hole.

The motor mounting bracket may be bonded along an inner surface of the support bracket.

A welding groove may be formed along the circumference of the support bracket in the insertion portion of the support bracket.

The welding groove may be welded to an entry of the insertion hole of the tube body.

A predetermined gap may be formed between the inner circumference of the insertion hole and the outer circumference of the insertion portion.

The tube body may form a bent portion bent to the center portion of the insertion hole at the entry of the insertion hole.

A manufacturing method of the bicycle frame in other forms of the present disclosure may include the steps of (a) providing a main frame forming a plurality of tube bodies and having an insertion hole at a lower end portion of the tube body, (b) providing a support bracket, wherein the support bracket comprises an insertion portion that is capable of inserting into the insertion hole of the main frame, (c) providing a motor mounting bracket having a motor mounting portion configured to mount a motor therein, (d) bonding the support bracket and the motor mounting bracket, and (e) inserting the insertion portion of the support bracket into the insertion hole of the main frame and bonding the entry of the insertion hole and the insertion portion.

The step of (d) may provide a sub frame formed by bonding the support bracket and the motor mounting bracket and corresponds to a specification and a shape of the motor.

The step of (c) may form a joining end portion at an upper end portion of the motor mounting bracket.

The step of (d) may bond the joining end portion of the motor mounting bracket to an inner side surface of the support bracket.

The step of (e) may bond the sub frame to a lower end portion of the main frame through the support bracket.

The step of (b) may form a welding groove in the insertion portion of the support bracket along the circumference of the support bracket.

The step of (e) may form a predetermined gap between the inner circumference of the insertion hole and the outer circumference of the insertion portion.

The step of (e) may bond the entry of the insertion hole of the tube body and the welding groove.

The step of (e) may form a bent portion bent at the central direction of the insertion hole at the entrance end portion of the insertion hole.

The step of (e) may bond the entry of the insertion hole of the tube body and the welding groove.

The step of (a) may form a plurality of tube bodies by bonding both side panels formed in a predetermined shape through.

The step of (a) may form a first joining portion in the main frame by bonding the both side panels.

The step of (d) may form a second joining portion in the sub frame by bonding the support bracket and the mounting bracket.

The step of (e) may form a third joining portion by bonding a lower end portion of the tube body and the support bracket of the sub frame.

The forms of the present disclosure can manufacture a main frame with a single stamping mold, separately make sub frame corresponding to various specifications and shapes, and join the main frame and the sub frame, thereby reducing the overall manufacturing cost and improving the productivity and rigidity of the whole frame.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
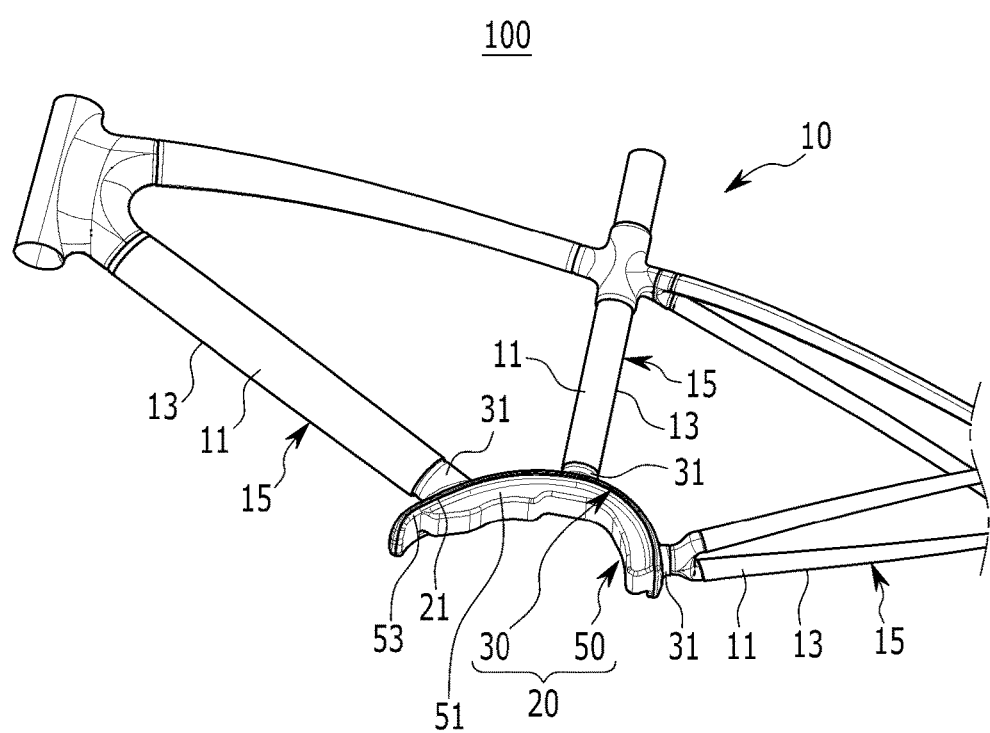
FIG. 1 is a coupling perspective view of a bicycle frame.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, the names of the components are distinguished by first, second, and so on in order to distinguish the components from each other in the same relationship, and are not necessarily limited to the order in the following description.

Figure 2:
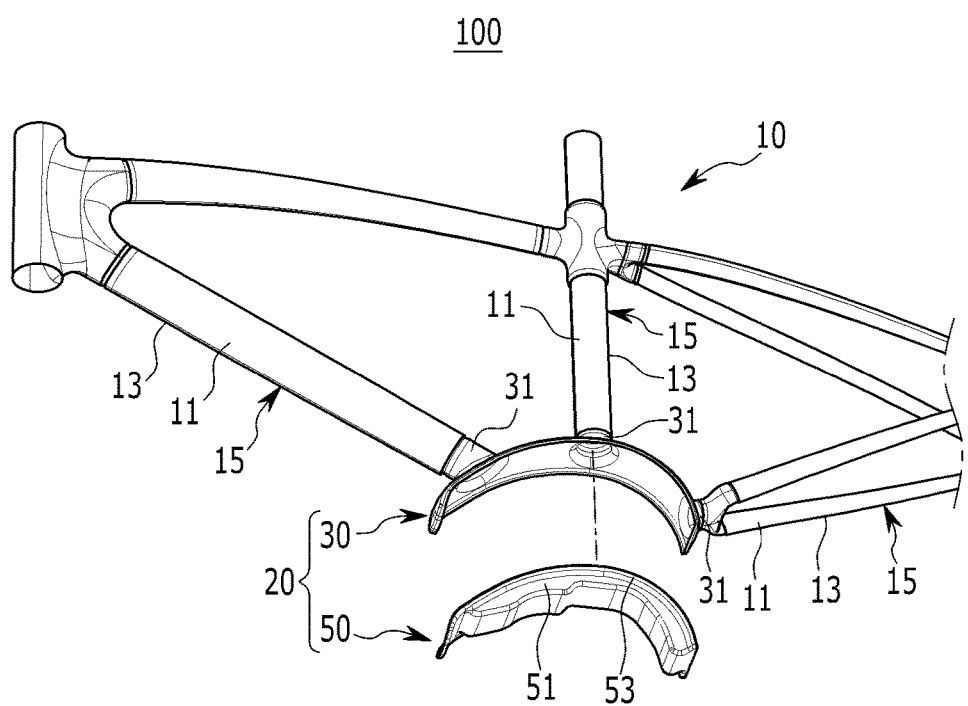
FIG. 2 and FIG. 3 are dissembled perspective views of a bicycle frame.
Figure 3:
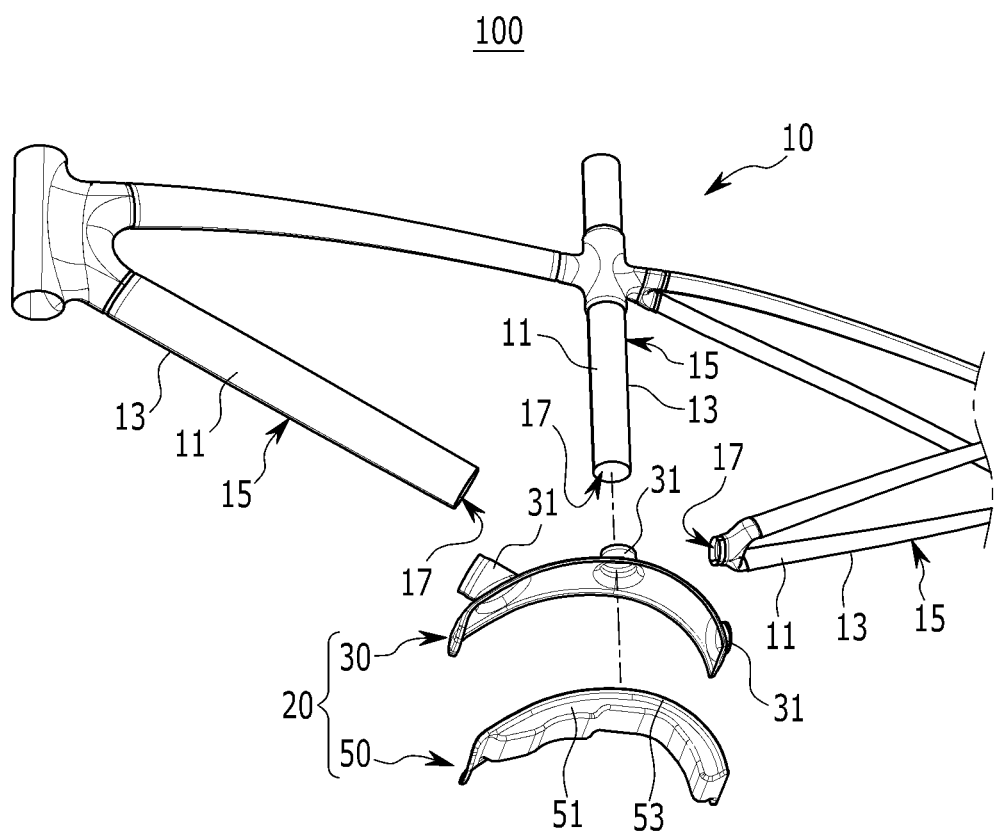

FIG. 1 is a coupling perspective view of a bicycle frame and FIG. 2 and FIG. 3 are dissembled perspective views of a bicycle frame.

Referring to FIG. 1 to FIG. 3, a bicycle frame 100 in some forms of the present disclosure may be applied to an electric bicycle which mounts a motor (not shown) driven by a power of a battery (not shown).

For example, the bicycle frame 100 in some forms of the present disclosure may include a head tube, a seat tube, a top tube, a down tube, a seat stay, and a chain stay.

Furthermore, the bicycle frame 100 in some forms of the present disclosure may include a tube-shaped stamping frame formed by stamping left and right panels respectively and joining the stamped left and right panels together.

Here, the bicycle frame 100 may be composed of one frame or a frame divided into two or more.

The bicycle frame 100 may include additional components such as various brackets, cases, collars and blocks for mounting bicycle components of known technology.

However, since the above-mentioned various sub-elements are for mounting various bicycle parts on the bicycle frame 100, the above-mentioned sub-elements are collectively referred to as a bicycle frame except in exceptional cases.

The bicycle frame 100 in some forms of the present disclosure can be manufactured as a single stamping mold without the need to newly produce stamping molds according to various specifications and shapes of motors, and may include a module-type motor mounting portion capable of mounting a motor of various specifications and shapes.

To this end, the bicycle frame 100 in some forms of the present disclosure basically includes a main frame 10 and a sub-frame 20 as a module-type motor mounting portion. The sub-frame 20 may include a support bracket 30 and a motor mounting bracket 50.

In some forms of the present disclosure, the main frame 10 is formed by stamp-forming a plate material into a predetermined shape through a stamping die, and welding the stamping-formed right and left side panels 11 to each other.

The main frame 10 may be equipped with a bicycle steering wheel, a saddle and a battery (not shown in the drawing), and so on.

Here, the main frame 10 may form a first joining portion 13 where the left and right side panels 11 are bonded to each other.

The main frame 10 may include a plurality of tube bodies 15 such as a head tube, a seat tube, and a chain stay.

An insertion hole 17 may formed at the lower end portion of the tube body 15.

In some forms of the present disclosure, the sub frame 20 is a module-type motor mounting part for mounting a motor having various specifications and shapes, and is separately provided from the main frame 10 and is bonded to the lower end portion of the main frame 10, that is, the lower end portion of the tube body 15.

The sub frame 20 may be constructed by mutually joining the support bracket 30 and the motor mounting bracket 50 mentioned above, and structured to be able to mount a motor of various specifications and shapes.

In some forms of the present disclosure, the support bracket 30 is for supporting the lower end portion of the main frame 10 and includes a plurality of insertion portions 31 corresponding to the tube body 15 of the main frame 10.

The insertion portion 31 is inserted into the insertion hole 17 of the tube body 15 in the main frame 10 and bonded thereto.

The support bracket 30 may be provided in a form corresponding to various specifications and shapes of the motor.

In some forms of the present disclosure, the motor mounting bracket 50 is for mounting a motor of various specifications and shapes and is welded to the support bracket 30.

The motor mounting bracket 50 may include a motor mounting portion 51 for mounting the motor and is welded to the inner surface of the support bracket 30.

At the upper end portion of the motor mounting bracket 50, a welding end portion 53 welded along the inner surface of the support bracket 30 is formed.

The motor mounting bracket 50 may be provided in a shape corresponding to various specifications and shapes of the motor and include an outer shape corresponding to the inner shape of the support bracket 30.

Accordingly, the support bracket 30 and the motor mounting bracket 50 as described above are welded to each other and are composed of a sub frame 20 as a module type motor mounting portion corresponding to the specification and shape of the motor.

The sub frame 20 may be joined to the lower end portion of the main frame 10 through the support bracket 30.

In the sub frame 20, a second joining portion 21 may be formed by bonding the inner surface of the support bracket 30 and the joining end portion 53 of the motor mounting bracket 50.

In the sub frame 20 as described above, the insertion portion 31 of the support bracket 30 may be inserted into the insertion hole 17 of the tube body 15, which is the lower end portion of the main frame 10, and welded along the circumference of the insertion hole 17.

That is, the insertion portion 31 of the support bracket 30 may be welded to the entrance end portion of the insertion hole 17 along the circumference of the insertion hole 17 of the tube body 15.

A welding groove 33 may be formed in the insertion portion 31 of the support bracket 30 along a circumference.

Figure 4:
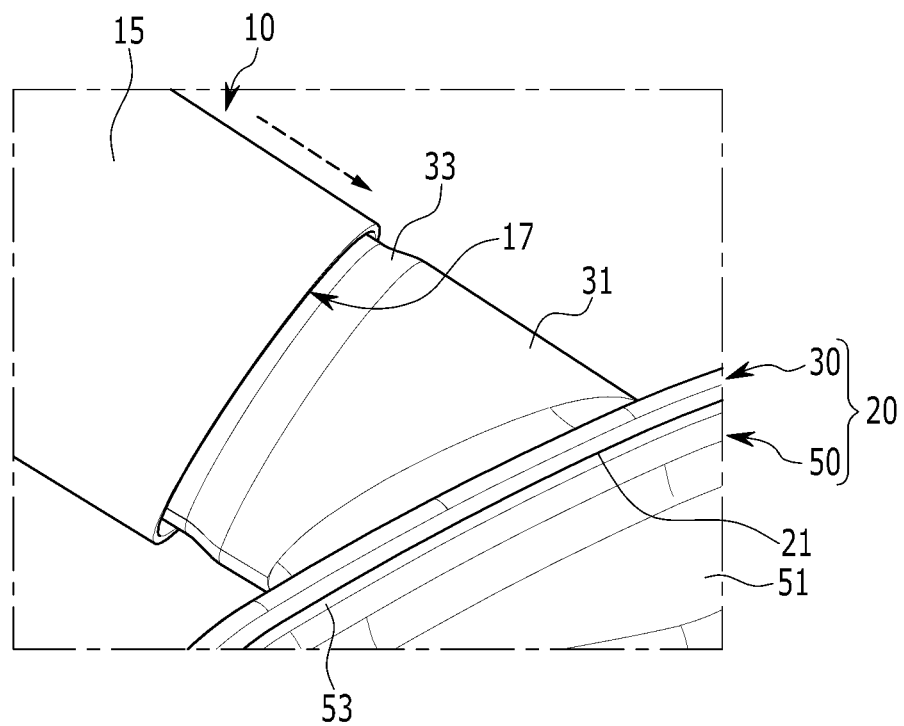
FIG. 4 and FIG. 5 are perspective views showing the joining structure of a support bracket and a motor mounting bracket applied to the bicycle frame.
Figure 5:
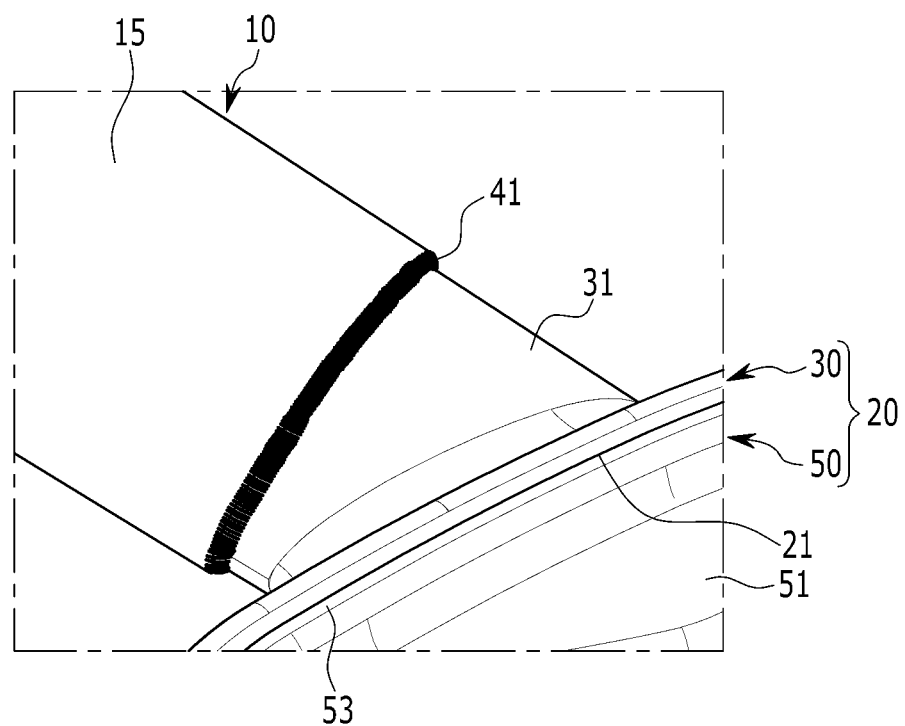

The welding groove 33 may be formed, shown in FIG. 4, 4, to the center of the insertion hole 17 at the insertion portion 31 inserted into the insertion hole 17 of the tube body 15 and as shown in FIG. 5, welded to the entrance end portion of the insertion hole 17 of the tube body 15.

Figure 6:
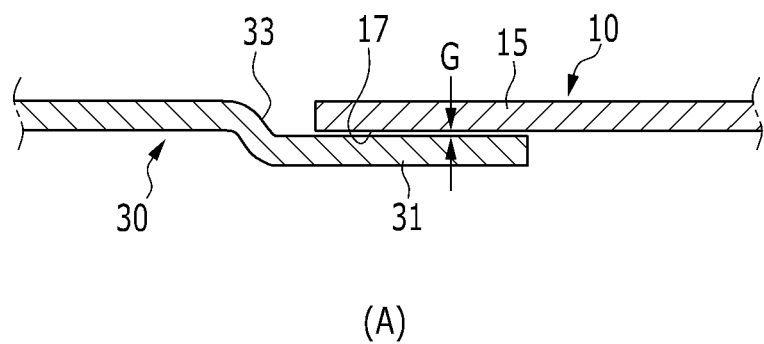
FIG. 6 and FIG. 7 are cross sectional views showing the joining structure of a support bracket and a motor mounting bracket applied to the bicycle frame.
Figure 6:
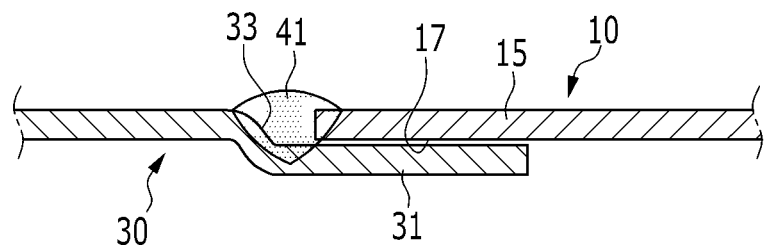

For example, as shown in FIG. 6, the insertion portion 31 of the support bracket 30 is inserted into the insertion hole 17 of the tube body 15 with a predetermined gap G from the inner circumferential surface of the insertion hole 17 and the distal end portion of the support bracket 30 to be welded to the entrance end of the insertion hole 17 along the welding groove 33 Can.

Figure 7:
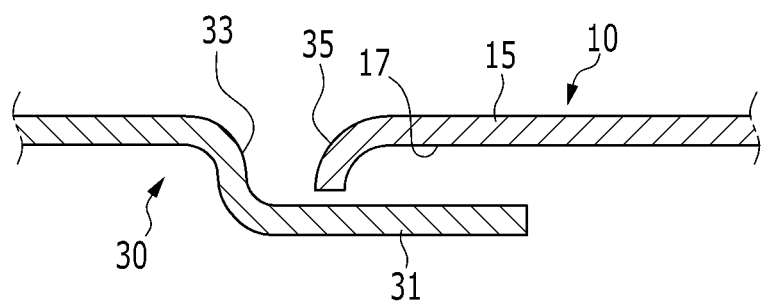
Figure 7:
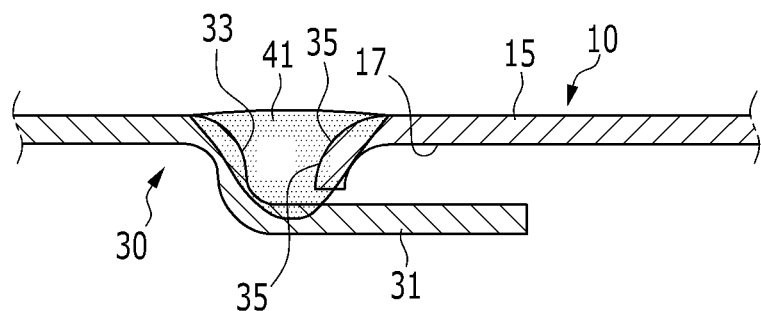

On the other hand, as shown in FIG. 7, a bent portion 35 may be formed at the entrance end portion of the insertion hole 17 of the tube body 15 into which the insertion portion 31 of the support bracket 30 is inserted.

In the insertion portion 31 of the support bracket 30, a welding groove 33 may be formed along the circumference. The depth of the welding groove 33 may be increased through the bent portion 35 and welded to the entrance end portion of the insertion hole 17.

That is, the insertion portion 31 of the support bracket 30 may inserted into the insertion hole 17 of the tube body 15 and welded to the bent portion 35 along the welding groove 33.

Between the tube body 15 of the main frame 10 and the support bracket 30 of the sub frame 20, a third joining portion 41 in which the entrance end portion of the insertion hole 17 and the welding groove 33 of the insertion portion 31 are welded together, may be formed.

Hereinafter, the manufacturing method of the bicycle frame 100 according to an exemplary form of the present disclosure will be described in detail with reference to drawings and accompanying drawings.

Figure 8:
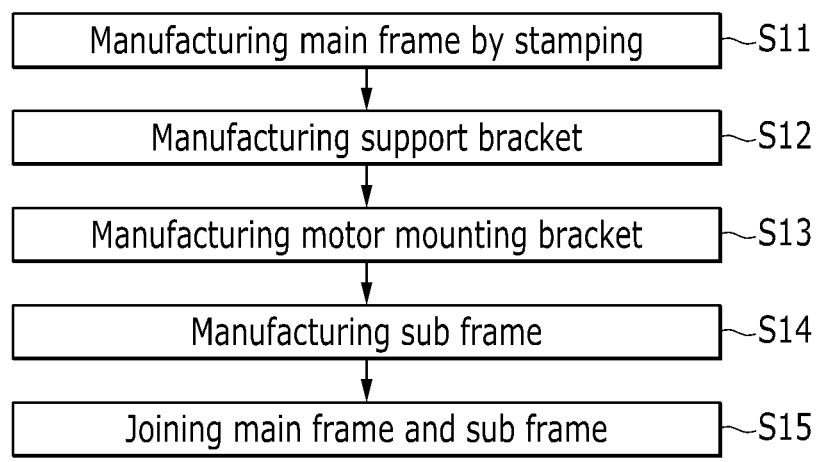
FIG. 8 is a flow chart explaining a manufacturing method of a bicycle frame.

FIG. 8 is a flow chart explaining a manufacturing method of a bicycle frame in some forms of the present disclosure.

Referring to FIG. 8, in some forms of the present disclosure, the main frame 10 may be formed by stamping plate into a predetermined shape through a stamping die and then, welding the stamped left and right side panels 11 to each other (step S11).

The main frame 10 forms a plurality of tube bodies 15, and an insertion hole 17 is formed in the lower end portion of the tube body 15.

The main frame 10 forms a first joining portion 13 that welds the left and right side panels 11 to each other.

Then, in some forms of the present disclosure, a support bracket 30 having an insertion portion 31 insertable into the insertion hole 17 of the main frame 10 is provided (step S12), and a motor mounting bracket 50 having a motor mounting portion 51 for mounting a motor is provided (step S13).

The support bracket 30 is provided in a shape corresponding to various specifications and shapes of the motor and the motor mounting bracket 50 included an outer shape corresponding to the inner shape of the support bracket 30.

In the step S12, the welding groove 33 is machined along the circumference at the insertion portion 31 of the support bracket 30, and in the step S13, the joining end portion 53 is machined at the upper end portion of the motor mounting bracket 50.

Thereafter, some forms of the present disclosure provides a sub frame 20 joined a support bracket 30 and a motor mounting bracket 50 joined (step S14).

In the step S14, the joining end portion 53 of the motor mounting bracket 50 is positioned on the inner side surface of the support bracket 30, and the inner side surface of the support bracket 30 and the joining end 53 are welded to fabricate the sub frame 20 corresponding to the specification and shape of the motor.

In the sub frame 20, a second joining portion 21 is formed by welding the joint end portion 53 of the motor mounting bracket 50 along the inner side surface of the support bracket 30.

Then, in some forms of the present disclosure, the sub frame 20 is joined to the lower end portion of the main frame 10 through the support bracket 30 (step S15).

In the step S15, the insertion portion 31 of the support bracket 30 is inserted into the insertion hole 17 of the tube body 15 of the main frame 10 and the entrance end portion of the insertion hole 17 is welded to the insertion portion 31.

Specifically, in the step S15, the insertion portion 31 of the support bracket 30 is inserted into the insertion hole 17 of the tube body 15 while a predetermined gap G is provided between the inner circumference of the insertion hole 17 and the outer circumference surface of the insertion portion 31.

Then, in some forms of the present disclosure, the welding groove 33 of the insertion portion 31 and the entrance end portion of the insertion hole 17 are welded to each other.

Meanwhile, in the step S11, during fabricating the main body frame, the bent portion 35 bent in the central direction of the insertion hole 17 at the entrance end portion of the insertion hole 17 of the tube body 15 is machined.

In the step S15, the insertion portion 31 of the support bracket 30 is inserted into the insertion hole 17 of the tube body 15, and the welding groove 33 of the insertion portion 31 is welded to the bent portion 35.

Between the tube body 15 of the main frame 10 and the support bracket 30 of the sub frame 20, a third joining portion 41 is formed by bonding the entrance end portion of the insertion hole 17 and the welding groove 33 of the insertion portion 31.

Accordingly, in some forms of the present disclosure, a bicycle frame 100 may be manufactured by bonding a sub frame 20 as a module-type motor mounting portion to the lower end portion of a stamped main frame 10 through a series of processes as described above.

In some forms of the present disclosure as described above, by bonding the sub frame 20 as a module type motor mounting portion corresponding to various specifications and shapes of the motor to the main frame 10 as a stamping frame, the bicycle frame 100 can be fabricated as a single stamping mold without the need to create a new stamping mold to match the various specifications and shapes of the motor.

As a result, some forms of the present disclosure allow a motor having various specifications and shapes to be mounted on a main frame 10 of a single design through a sub frame 20, so that each motor manufacturer's product can be configured.

In addition, in some forms of the present disclosure, it is not desired to newly fabricate a stamping die according to various specifications and shapes of motors, thereby reducing cycle time for mold replacement and the like.

Further, in some forms of the present disclosure, the main frame 10 is manufactured in one design, the sub frame 20 is manufactured separately according to the specification and shape of the motor, and the main frame 10 and the sub frame 20 are bonded to each other, thereby reducing investment cost and overall production cost.

Furthermore, in some forms of the present disclosure, a welding groove 33 is formed in the insertion portion 31 of the support bracket 30, and the tube body 15 of the main frame 10 is joined through the welding groove 33, thereby improving the overall frame productivity and rigidity.

In addition, in some forms of the present disclosure, since the welding bracket and the main frame 10 are welded to each other using the welding groove 33, welding can be easily performed and the protrude portion of the weld line can be reduced so that it is possible to improve the merchantability of the frame.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

10: main frame
11: both side panels
13: a first joining portion
15: tube body
17: insertion hole
20: sub frame
21: a second joining portion
30: support bracket
31: insertion portion
33: welding groove
35: bent portion
41: a third joining portion
50: motor mounting bracket
51: motor mounting portion
53: welding end portion
G: gap

What is claimed is:

1. A bicycle frame comprising:
a main frame;
a support bracket, wherein the support bracket is formed separately from the main frame and is bonded to a lower end portion of the main frame; and
a motor mounting bracket having a motor mounting portion configured to mount a motor therein, wherein the motor mounting bracket is formed separately from the support bracket and is bonded to the support bracket,
wherein the main frame is formed by bonding a pair of side panels in a predetermined shape through stamping,
wherein the main frame comprises a plurality of tube bodies, and an insertion hole is formed at a lower end portion of the tube body,
wherein the support bracket comprises an insertion portion that is capable of inserting into the insertion hole of the tube body and bonded along a circumference of the insertion hole,
wherein a welding groove is configured to form in the insertion portion of the support bracket along a circumference of the support bracket and to weld to an entry of the insertion hole of the tube body, and
wherein a predetermined gap is formed between an inner circumference of the insertion hole and an outer circumference of the insertion portion.

2. The bicycle frame of claim 1, wherein:
the support bracket and the motor mounting bracket are bonded to each other and are provided as a sub frame corresponding to a specification and a shape of the motor.

3. The bicycle frame of claim 2, wherein:
the sub frame is bonded to the lower end portion of the main frame through the support bracket.

4. The bicycle frame of claim 1, wherein:
the motor mounting bracket is bonded along an inner surface of the support bracket.

5. The bicycle frame of claim 1, wherein:
a bent portion is formed in the tube body and the bent portion is bent to the center portion of the insertion hole at the entry of the insertion hole.

6. A manufacturing method of a bicycle frame comprising the steps of:
(a) providing a main frame, wherein the main frame forms a plurality of tube bodies and has an insertion hole at a lower end portion of the tube body;

(b) providing a support bracket, wherein the support bracket comprises an insertion portion that is capable of inserting into the insertion hole of the main frame;

(c) providing a motor mounting bracket having a motor mounting portion configured to mount a motor therein;

(d) bonding the support bracket and the motor mounting bracket; and (e) inserting the insertion portion of the support bracket into the insertion hole of the main frame and bonding the entry of the insertion hole and the insertion portion, wherein the step (b) comprises forming a welding groove in the insertion portion of the support bracket along a circumference of the support bracket, and wherein the step (e) comprises forming a predetermined gap between an inner circumference of the insertion hole and an outer circumference of the insertion portion, and bonding an entry of the insertion hole of the tube body and the welding groove.

7. The manufacturing method of claim 6, wherein the step (d) comprises:

providing a sub frame, wherein the sub frame is formed by bonding the support bracket and the motor mounting bracket and corresponds to a specification and a shape of the motor.

8. The manufacturing method of claim 6, further comprising:

in the step (c), forming a joining end portion at an upper end portion of the motor mounting bracket; and in the step (d), bonding the joining end portion of the motor mounting bracket to an inner surface of the support bracket.

9. The manufacturing method of claim 7, wherein the step (e) comprises:

bonding the sub frame to a lower end portion of the main frame through the support bracket.

10. The manufacturing method of claim 6, wherein the step (e) comprises:

forming a bent portion bent at the central direction of the insertion hole at the entrance end portion of the insertion hole; and bonding the entry of the insertion hole of the tube body and the welding groove.

11. The manufacturing method of claim 6, wherein the step (a) comprises:

forming a plurality of tube bodies by bonding a pair of side panels in a predetermined shape through stamping.

12. The manufacturing method of claim 11 further comprising:

in the step (a), forming a first joining portion in the main frame by bonding the both side panels;

in the step (d), forming a second joining portion in the sub frame by bonding the support bracket and the mounting bracket; and in the step (e), forming a third joining portion by bonding a lower end portion of the tube body and the support bracket of the sub frame.

\* \* \* \* \*